(12) United States Patent
Tanaka et al.

(10) Patent No.: US 6,474,826 B1
(45) Date of Patent: Nov. 5, 2002

(54) LIGHTING APPARATUS

(75) Inventors: Akira Tanaka; Sadao Tezuka; Isao Shiozawa; Masaya Hirano; Shingo Furukawa, all of Yokohama (JP)

(73) Assignee: Fujitsu Kasei Limited, Yokohama (JP)

( * ) Notice: Subject to any disclaimer, the term of this patent is extended or adjusted under 35 U.S.C. 154(b) by 3 days.

(21) Appl. No.: 09/722,102

(22) Filed: Nov. 27, 2000

(30) Foreign Application Priority Data

Dec. 28, 1999 (JP) .......................................... 11-374777
Feb. 23, 2000 (JP) ...................................... 2000-052162

(51) Int. Cl.[7] .............................................. F21V 7/04
(52) U.S. Cl. ...................... 362/31; 362/555; 362/339; 362/27
(58) Field of Search ..................... 362/31, 339, 561, 362/555, 558, 26, 27

(56) References Cited

U.S. PATENT DOCUMENTS 5,618,096 A * 4/1997 Parker et al. ................. 362/31
5,975,711 A * 11/1999 Parker et al. ................. 362/24
6,139,163 A * 10/2000 Satoh et al. .................. 362/31

FOREIGN PATENT DOCUMENTS

| EP | 0 866 264 | 9/1998 |
|---|---|---|
| EP | 0 945 673 | 9/1999 |
| EP | 0 962 694 | 12/1999 |
| JP | 11-231321 | 8/1999 |

OTHER PUBLICATIONS

Mesaki, Yoshinori et al., Workshop on Emissive Displays Workshop on Non–Emissive Displays, IDW '94, Proceedings of the First International Display Workshops, Oct. 26, 1994, Congress Center, ACT CITY Hamamatsu, Hamamatsu, Japa, pp. 83–87.

* cited by examiner

Primary Examiner—Sandra O'Shea
Assistant Examiner—Ali Alavi
(74) Attorney, Agent, or Firm—Staas & Halsey LLP

(57) ABSTRACT

A lighting apparatus for causing the light from a light source to enter the incident surface of a light guide plate and to project the light toward an object of illumination from the exit surface of the light guide plate extending in the direction perpendicular to the incident surface. The light source is made by placing a light-emitting diode on or near the light source rod extending in the longitudinal direction parallel to the incident surface of the light guide plate. The light source rod and the light guide plate are integrally made by forming a slot in a common plate.

25 Claims, 11 Drawing Sheets

Fig. 28

| REFRACTIVE INDEX | | | SLANT ANGLE α | INCIDENT ANGLE θ | RADIATION ANGLE φ |
|---|---|---|---|---|---|
| L | M | N | | | |
| 1.5 | 2.2 | 1.33 | 40° | −13 ~ −32° | 36 ~ 90° |
| | | | 43° | −15 ~ −38° | 29 ~ 90° |
| | | | 45° | −17 ~ −41° | 26 ~ 90° |
| | | | 50° | −22 ~ −48° | 18 ~ 67° |
| | | | 60° | −32 ~ −48° | 3 ~ 27° |
| | | | 70° | −40 ~ −48° | −15 ~ −3° |
| 1.5 | 2.4 | 1.40 | 40° | −27 ~ −32° | 64 ~ 90° |
| | | | 43° | −30 ~ −38° | 57 ~ 90° |
| | | | 45° | −32 ~ −42° | 52 ~ 90° |
| | | | 50° | −37 ~ −48° | 43 ~ 67° |
| | | | 60° | −47 ~ −48° | 26 ~ 28° |
| | | | 70° | — | — |
| 1.5 | 2.4 | 1.38 | 40° | −17 ~ −32° | 43 ~ 90° |
| | | | 43° | −20 ~ −38° | 37 ~ 90° |
| | | | 45° | −22 ~ −42° | 34 ~ 90° |
| | | | 50° | −27 ~ −48° | 26 ~ 67° |
| | | | 60° | −37 ~ −48° | 10 ~ 28° |
| | | | 70° | −47 — −48° | −5 ~ −3° |
| 1.5 | 2.4 | 1.36 | 40° | −15 ~ −32° | 39 ~ 90° |
| | | | 43° | −18 ~ −38° | 34 ~ 90° |
| | | | 45° | −20 ~ −42° | 31 ~ 90° |
| | | | 50° | −25 ~ −48° | 22 ~ 67° |
| | | | 60° | −35 ~ −48° | 7 ~ 28° |
| | | | 70° | −45 — −48° | −3 ~ −8° |

LIGHTING APPARATUS

BACKGROUND OF THE INVENTION

1. Field of the Invention

The present invention relates to a lighting apparatus in which the light generated from a light source including a light-emitting diode (hereinafter called LED) mounted on a light source rod is radiated onto an object through a light guide plate, or in particular to a lighting apparatus for a liquid crystal display unit.

2. Description of the Related Art

Liquid crystal display units are used for many products. Due to the lack of a light emitting ability, however, a liquid crystal display unit requires a front lighting apparatus for radiating light from the front side or a back lighting apparatus for radiating light from a non-display surface on the reverse side of the display screen.

In the case where the liquid crystal display unit is used for a comparatively large object such as the display screen of the personal computer, a front lighting apparatus or a back lighting apparatus comprising a cold cathode ray tube is used as a light source, wherein the light emitted from the cold cathode ray tube is projected toward the display surface or the reverse non-display surface of the liquid crystal display unit through a light guide plate.

The cold cathode ray tube, however, is too bulky to be used for illuminating the liquid crystal display unit used with a small product such as a portable telephone. In such a case, a front lighting apparatus or a back lighting apparatus comprising a light source configured with an LED coupled with a light source rod is used. The light emitted from the light source rod is projected toward the display surface or the reverse non-display surface of the liquid crystal display unit through a light guide plate.

FIG. 2 schematically shows a conventional lighting apparatus comprising a light source coupled to a light source rod, wherein the light source including the LED 40 coupled to a light source rod is formed in isolation from the light guide plate. The problem, therefore, is that a considerable time is consumed for assembly work.

SUMMARY OF THE INVENTION

In view of the problem described above, the object of the present invention is to provide an easy to produce lighting apparatus using a light source formed by coupling an LED to a light source rod.

According to this invention, there is provided a lighting apparatus for causing the light from a light source to enter the incident surface of a light guide plate and to project the light toward an object of the illumination from the exit surface of the light guide plate extending in the direction perpendicular to the incident surface toward an object of illumination, wherein the light source is made by placing a light-emitting diode, on or near a light source rod extending in the longitudinal direction parallel to the incident surface of the light guide plate, and the light source rod is integrally made by forming a slot in a common plate.

The present invention may be more fully understood from the description of preferred embodiments of the invention set forth below, together with the accompanying drawings.

BRIEF DESCRIPTION OF THE DRAWINGS

FIG. 28 is a diagram for explaining the effects of the sixth embodiment of the invention.

DESCRIPTION OF THE PREFERRED EMBODIMENTS

Embodiments of the present invention will be explained below with reference to the accompanying drawings.

Figure 1:
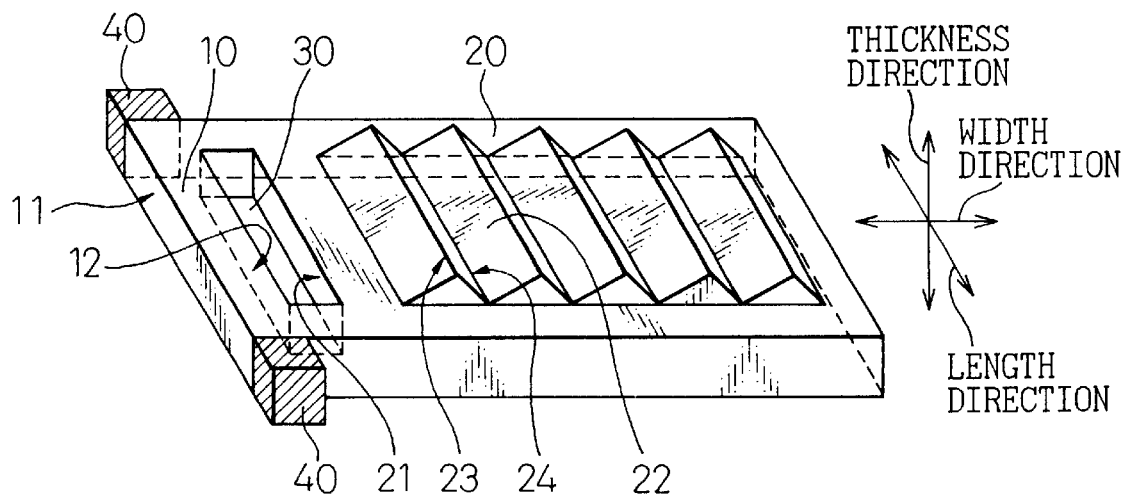
FIG. 1 is a perspective view of a lighting apparatus according to a first embodiment of the invention.
Figure 2:
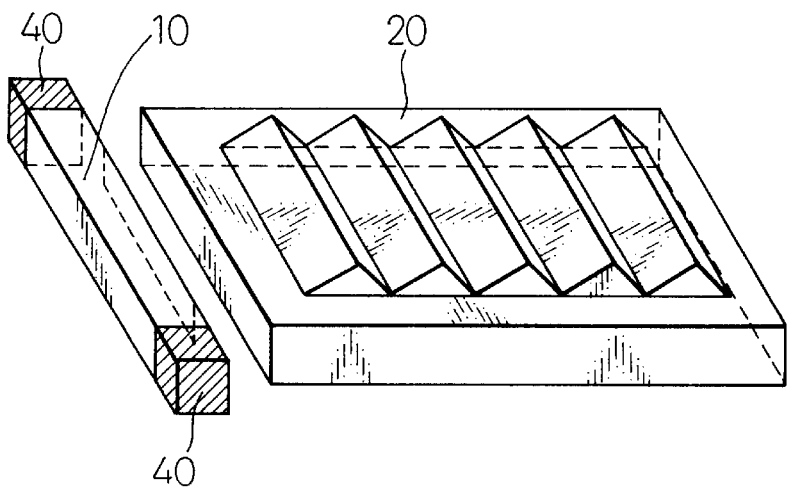
FIG. 2 is a perspective view of the conventional lighting apparatus.

First, the first embodiment will be described. FIG. 1 is a perspective view schematically showing a lighting apparatus according to the first embodiment.

For simplicity's sake, as noted on the right side of FIG. 1, assume that the direction in which an incident surface 21 of a light guide plate 20 extends is called the longitudinal direction, the direction along the thickness of the light guide plate 20 is simply called the direction along the thickness, and the direction in which the light guide plate 52 extends away from the light source unit 10 is called the transverse direction.

Figure 9:
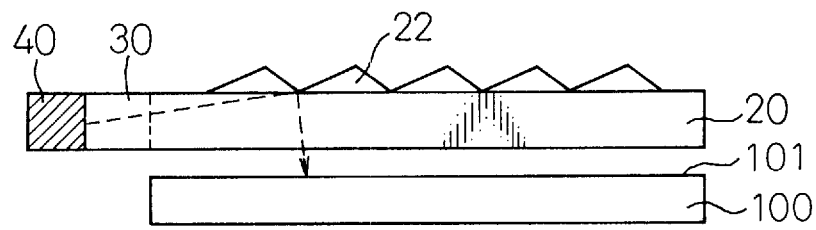
FIG. 9 is a diagram showing the lighting apparatus according to the first embodiment used as a front lighting apparatus of a liquid crystal display unit.

FIG. 1 shows a lighting apparatus used for a front lighting apparatus for illuminating the liquid crystal display unit from the display screen side thereof as shown in FIG. 9, for example. The lighting apparatus comprises a light source rod 10 on which LEDs 40 are coupled and a light guide plate 20 which are integrally made by forming a slot 30 in a common rectangular plate of resin such as polymethyl methacrylate (PMMA) having the refractive index of about 1.45 to 1.7.

In other words, the slot 30 is formed parallel to the neighborhood of one end surface on the left side of the rectangular plate in FIG. 1, in such a manner that the left side of the slot 30 makes up the light source rod 10 and the right side of the slot 30 constitutes the light guide plate 20.

The LEDs 40 are of edge emitting type and emit white light.

According to the first embodiment, as shown in FIG. 1, the LEDs 40 (hatched for facilitating understanding) are coupled to the longitudinal ends of the light source rod 10 extending in the longitudinal direction. The surface of the LEDs 40 except for the surface for coupling with the light source rod 10 is subjected to reflection treatment so as to prevent light from leaking out.

Figure 3:
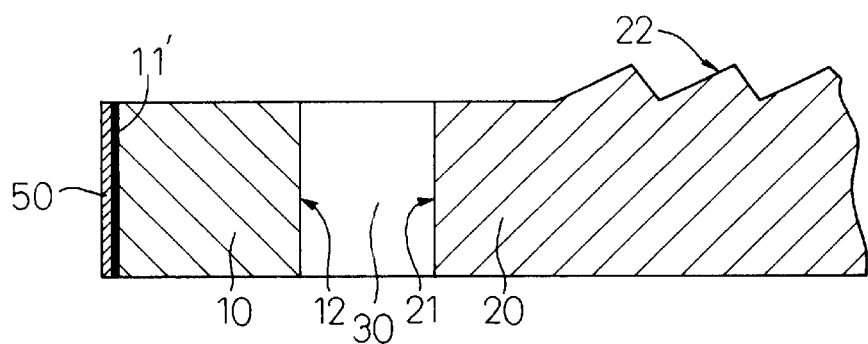
FIG. 3 is a sectional view of the lighting apparatus according to the first embodiment of the invention.

As shown in FIG. 3, the surface 11 on the left side of the light source rod 10 in the drawing is sandblasted into the surface 11' having micro-unevenness and a reflector 50 is arranged outside thereof. As a result, the light that has entered the light source rod 10 from the LEDs 40 exits into the slot 30 from the surface 12 of the light source rod 10 on the right side in the drawing.

The light that has been emitted into the slot 30 enters the light guide plate 20 from the end surface of the light guide plate 20 on the left side in the drawing. A prism array 22 having ridges 23 and valleys 24 extending parallel to the left end surface 21 of the light guide plate 20 is formed on the upper surface of the light guide plate 20 in the drawing. Thus, the light that has entered the light guide plate 20 from the end surface 21 thereof on the left side in the drawing is deflected downward in the drawing by the prism array 22 and leaves the light guide plate 20 from the lower surface thereof in the drawing and illuminates the display screen of the liquid crystal display unit (not shown) arranged under the light guide plate 20.

In the first embodiment configured as described above, the light source rod 10 and the light guide plate 20 are integrated with each other. Therefore, the fabrication is easy as it is not necessary to assemble the light source rod 10 and the light guide plate 20 to each other unlike in the prior art.

Figure 4:
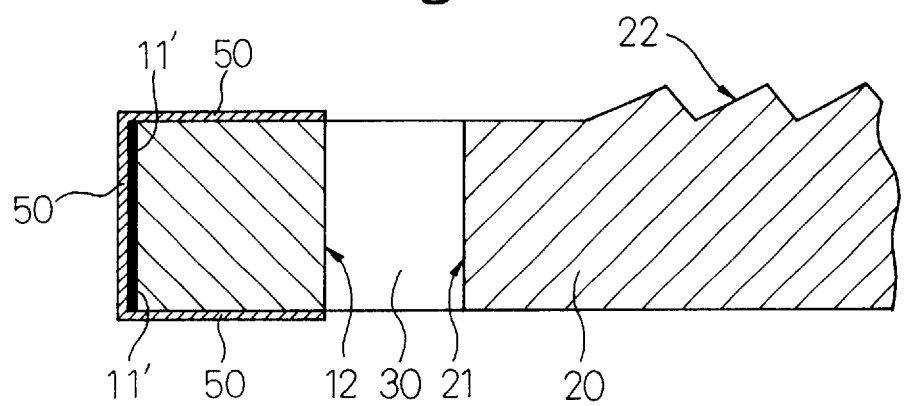
FIG. 4 is a sectional view of a lighting apparatus according to a first modification of the first embodiment of the invention.
Figure 5:
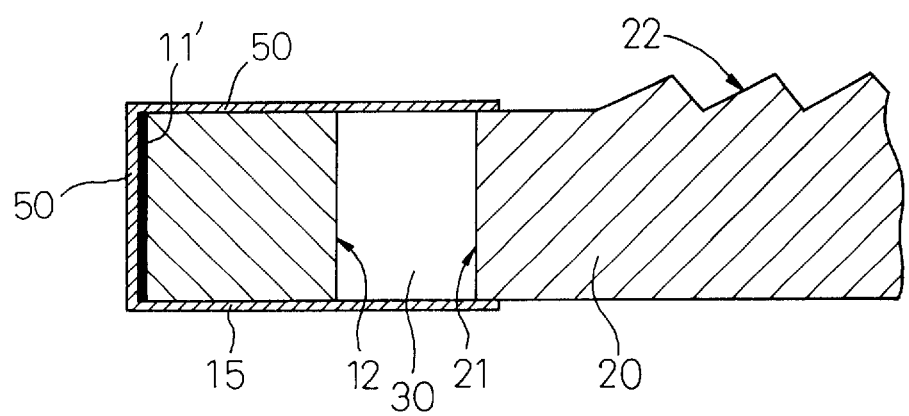
FIG. 5 is a sectional view of a lighting apparatus according to a second modification of the first embodiment of the invention.

FIG. 4 is a diagram showing the feature of the first modification of the first embodiment in which the reflector 50 is arranged on both the upper and lower surfaces of the light source rod 10. FIG. 5 is a diagram showing the feature of the second modification of the first embodiment in which the reflector 50 arranged on each of the upper and lower surfaces of the light source rod 10 is extended toward the light guide plate 20 to cover the upper opening 31 and the lower opening 32 of the light source rod 10.

Figure 6:
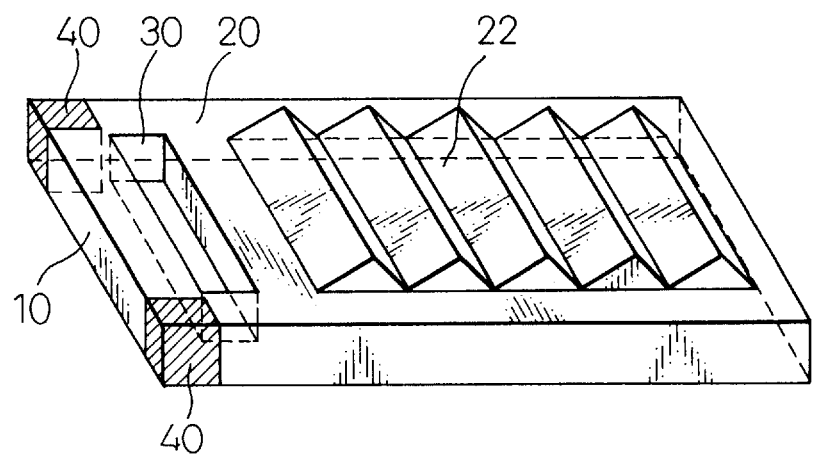
FIG. 6 is a perspective view of a lighting apparatus according to a third modification of the first embodiment the invention.

FIG. 6 is a diagram showing a configuration of the third modification of the first embodiment, in which the LEDs 40 are arranged in those corners of the board which are notched so that the light source rod 10 is shorter than the light guide plate 20. By doing so, all of the LEDs 40 can fit snugly without protrusion. The other portions of the configuration are identical to those of the first embodiment.

Figure 7:
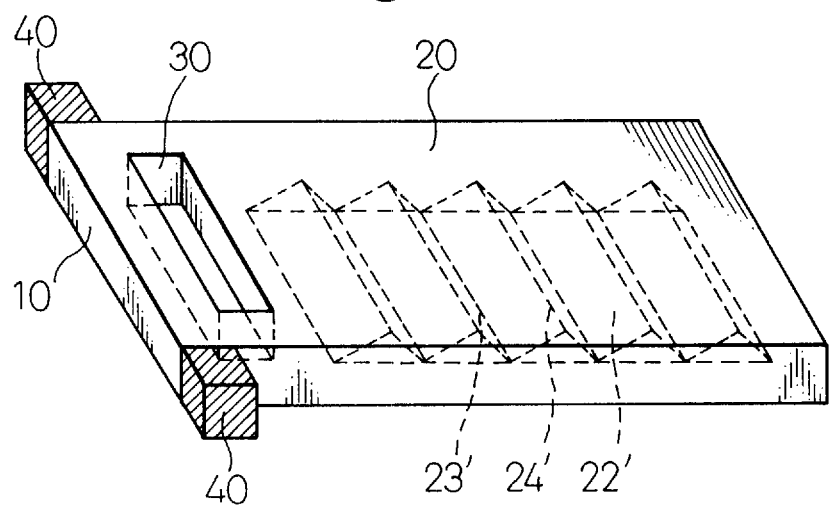
FIG. 7 is a perspective view of a lighting apparatus according to a fourth modification of the first embodiment of the invention.

FIG. 7 is a diagram showing a configuration according to the fourth modification of the first embodiment. This configuration is different from the first embodiment in the provision of a prism array 22' arranged on the lower surface of the light guide plate 20 and having ridges 23' and valleys 24' extending along the length of the light source rod 10.

Figure 8:
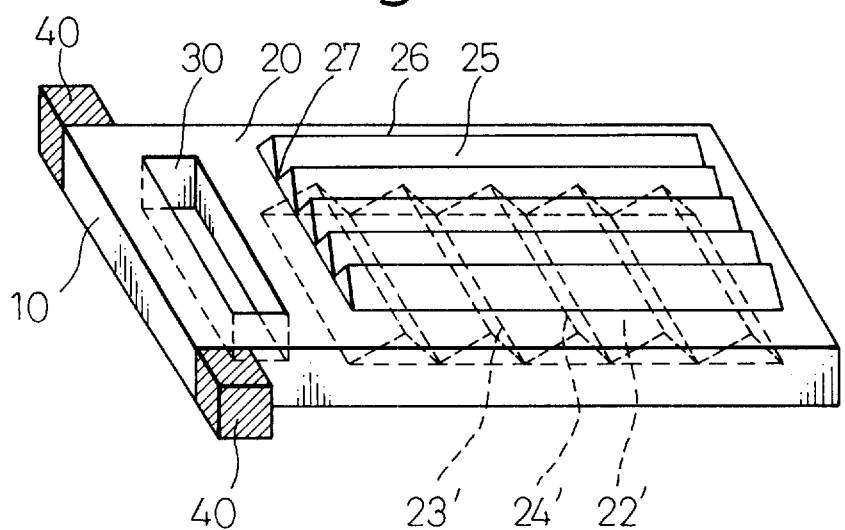
FIG. 8 is a perspective view of a lighting apparatus according to a fifth modification of the first embodiment of the invention.

FIG. 8 is a diagram showing a configuration according to the fifth modification of the first embodiment. This configuration is different from the fourth modification of the first embodiment in the provision of a prism array 25 arranged on the upper surface of the light guide plate 20 and having ridges 26 and valleys 27 extending in the direction perpendicular to the length of the light source rod 10.

FIG. 9 is a diagram showing the whole of the lighting system for illuminating the display screen of the front-lighting liquid crystal display unit 50 from the front side thereof using a lighting apparatus according to the first embodiment.

Figure 10:
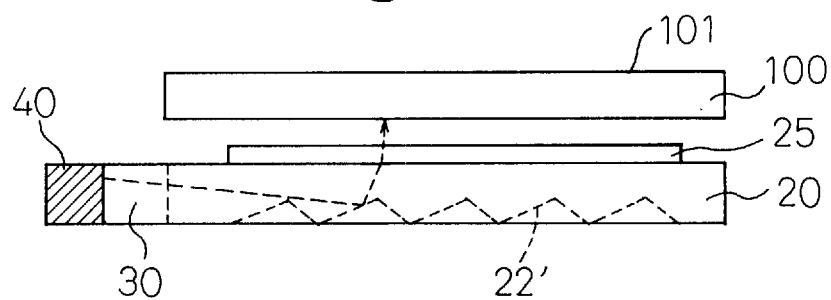
FIG. 10 is a diagram showing a lighting apparatus according to the fifth modification of the first embodiment used as a back lighting apparatus of a liquid crystal display unit.

FIG. 10 is a diagram showing the whole of the lighting system for illuminating the display screen 51 of the back-lighting liquid crystal display unit 50 from the reverse side thereof using a lighting apparatus according to the fourth modification of the first embodiment, in which the route of the light emitted from the light source rod 10 is indicated by dashed line.

Figure 11:
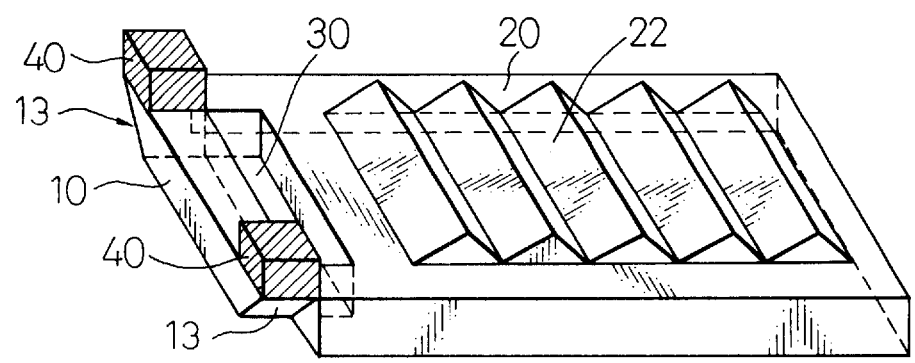
FIG. 11 is a perspective view of the lighting apparatus according to a second embodiment of the invention.

FIG. 11 is a diagram showing a configuration of the second embodiment, in which the LEDs 40 are coupled to the upper surface ends of the light source rod 10, and the lower surface of the end portions of the light source rod 10 to which the LEDs 40 are coupled are cut diagonally as shown thereby to form inclined surfaces 13. A reflector, not shown, is arranged on each of the inclined surfaces 13.

Figure 12:
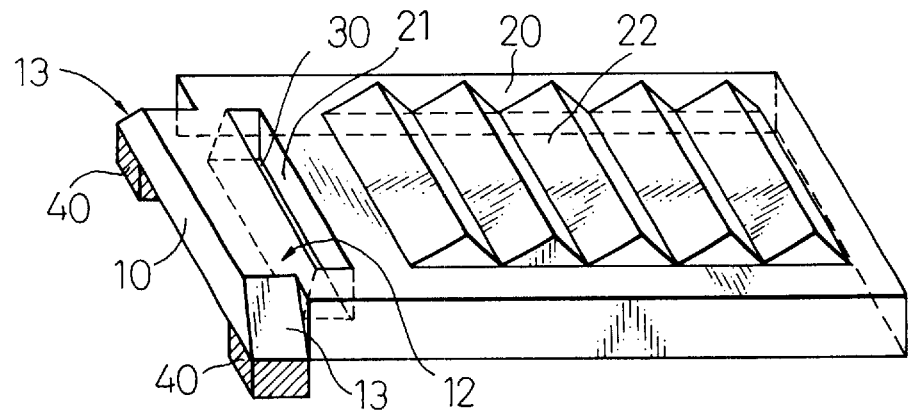
FIG. 12 is a perspective view of the lighting apparatus according to a first modification of the second embodiment of the invention.

FIG. 12 is a diagram showing a configuration according to the first modification of the second embodiment in which, opposite to the second embodiment, the LEDS 40 are coupled to the lower surface ends of the light source rod 10, and the upper surface of the end portions of the light source rod 10 to which the LEDs 40 are coupled is cut diagonally as shown thereby to form inclined surfaces 13. A reflector, not shown, is arranged on each of the inclined surfaces 13.

Also, that side surface 12 of the light source rod 10 making up the slot 30 which is nearer to the light guide plate is inclined so that the upper side of the light source rod 10 approaches the light guide plate 20. The inclination of that side surface 12 of the light source rod 10 making up the slot 30 which is nearer to the light guide plate in this way is also applicable to the other embodiments. It is also possible to incline the incident surface 21 of the light guide plate 20 or both the surfaces 12 and 21.

Figure 13:
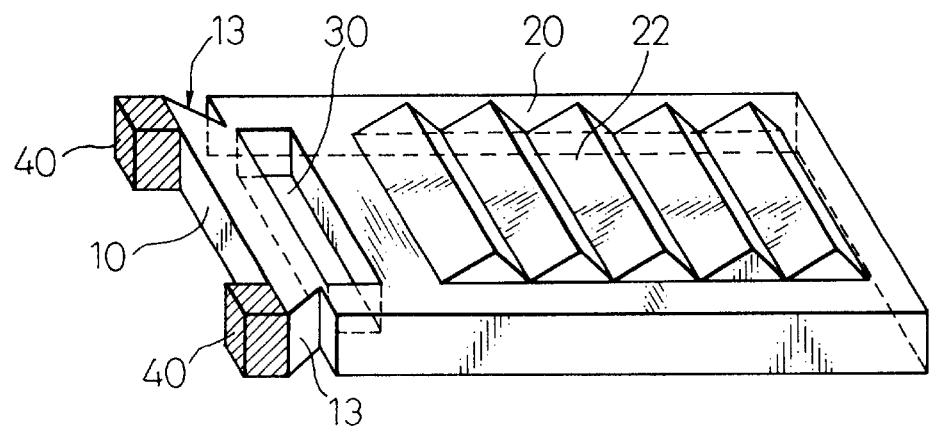
FIG. 13 is a perspective view of the lighting apparatus according to a second modification of the second embodiment of the invention.

FIG. 13 is a diagram showing a configuration according to the second modification of the second embodiment, in which the LEDs 40 are coupled to the end surface of the light source rod 10 on the left side in the drawing, and inclined surfaces 13 are notched diagonally inward of the end portion of the light source rod 10 as shown. A reflector, not shown, is arranged on each inclined surface 13.

Figure 14:
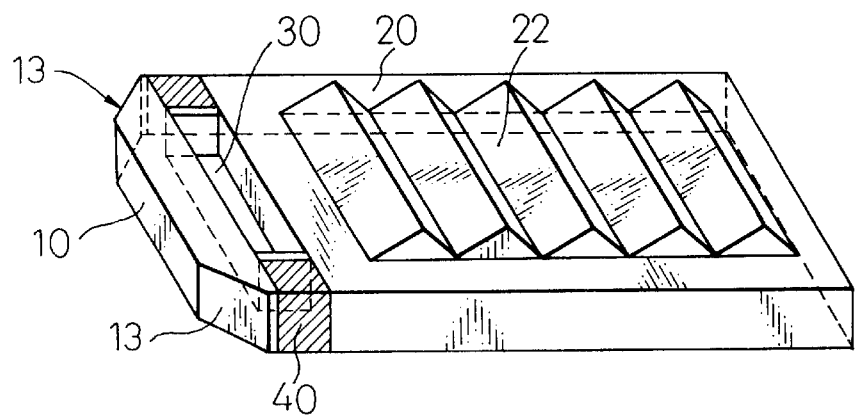
FIG. 14 is a perspective view of the lighting apparatus according to a third modification of the second embodiment of the invention.

FIG. 14 is a diagram showing a configuration according to the third modification of the second embodiment, in which a portion connecting the light source rod 10 and the light guide plate 20 is notched and the LEDs 40 are arranged in the notches with corresponding inclined surfaces 13 of the light source rod 10 as shown. A reflector, not shown, is arranged on each inclined surface 13.

Figure 15:
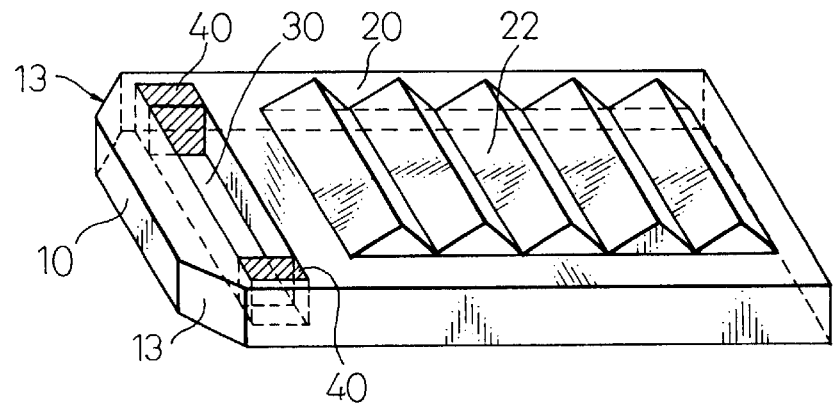
FIG. 15 is a perspective view of the lighting apparatus according to a fourth modification of the second embodiment of the invention.

FIG. 15 is a diagram showing a configuration according to the fourth modification of the second embodiment, in which the slot 30 is formed to a larger length in advance with the light source rod 10 arranged therein. The corners of the light source rod 10 are notched as shown to form inclined surfaces 13, on each of which a reflector, not shown, is arranged.

Figure 16:
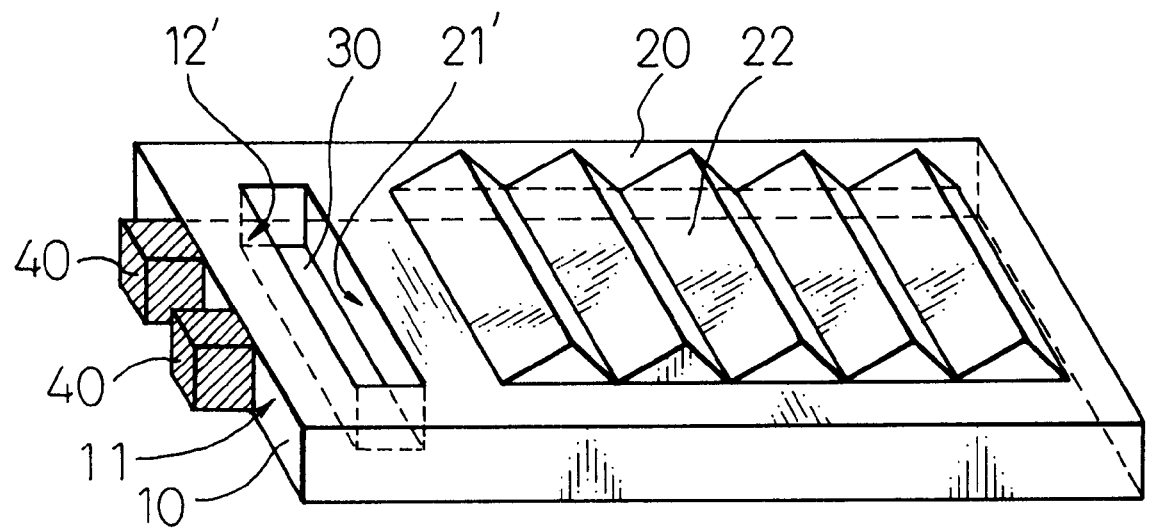
FIG. 16 is a perspective view of the lighting apparatus according to a third embodiment of the invention.

FIG. 16 is a diagram showing a configuration according to the third embodiment, in which the LEDs 40 are arranged not at the end portions but on the central portion of the surface 11 of the light source rod 10 far from the light guide plate. The side surface of the light source rod 10 nearer to the light guide plate and the side surface of the light guide plate 20 nearer to the light source rod making up the slot 30 are sand-blasted into the surfaces 11' and 21', respectively, having an unevenness thereby to assure that uniform light enters the light guide plate 20.

In similar fashion, the LEDs 40 can alternatively be arranged on the upper surface or the lower surface at the central portion of the light source rod 10 with equal effect.

As another alternative, the side surface 12 of the light source rod 10 nearer to the light guide plate 20 and the side surface of the light guide plate 20 nearer to the light source rod 10 are not sand-blasted but can be formed into a prism surface with ridges and valleys extending parallel to each other in the longitudinal direction. These alternatives are applicable to both the embodiments and the modifications thereof. Also, only one of the side surfaces may be processed in the manner mentioned above.

Figure 17:
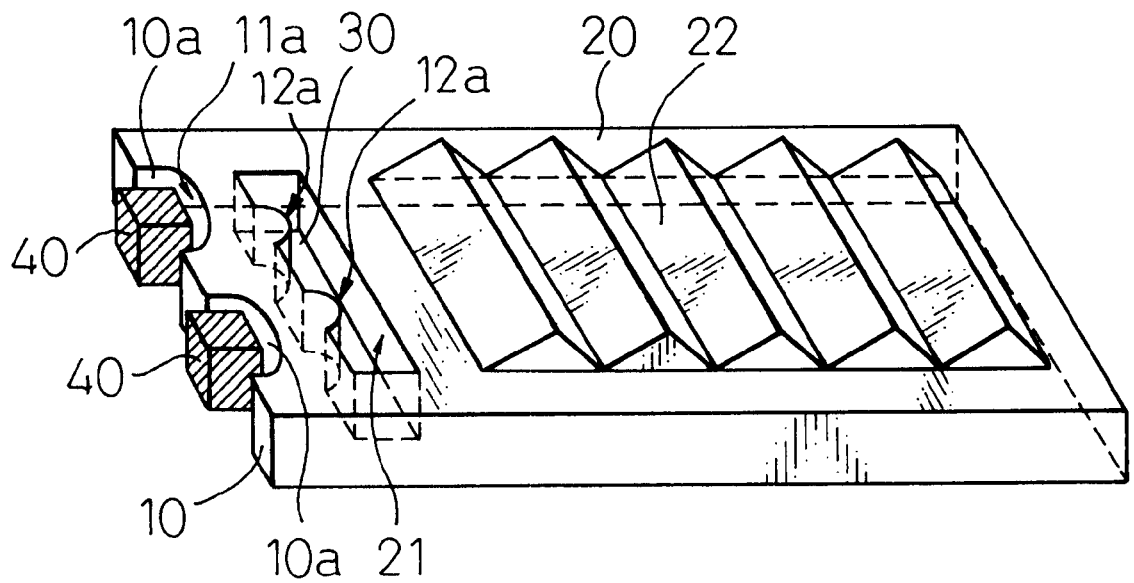
FIG. 17 is a perspective view of the lighting apparatus according to a fourth embodiment of the invention.

FIG. 17 is a diagram showing a configuration according to the fourth embodiment, in which that side surface at the central portion of the light source rod 10 which is far from the light guide plate is formed with recesses 10a each having a concave lens surface 11a. The LEDs 40 are arranged in a manner not to be in direct contact with the light source rod 10 so that a part of each LED 40 may be located within the corresponding recess 10a.

That side surface of the light source rod 10 making up the slot 30 which is nearer to the light guide plate has concave lens surfaces 12a on the side thereof far from the light guide plate so that uniform light may enter the light guide plate 20.

It is also possible to form a recess in both the upper and lower surfaces of the light source rod 10 with a part of each LED 40 arranged in the recesses. Further, the recesses may be formed in the neighborhood of the end portions.

Furthermore, the provision of the lens surface 12 of the light source rod 10 nearer to the light guide plate is applicable to the first and eighth embodiments with equal effect, and the incident surface 21 of the light guide plate can also be formed as a lens surface.

Figure 18:
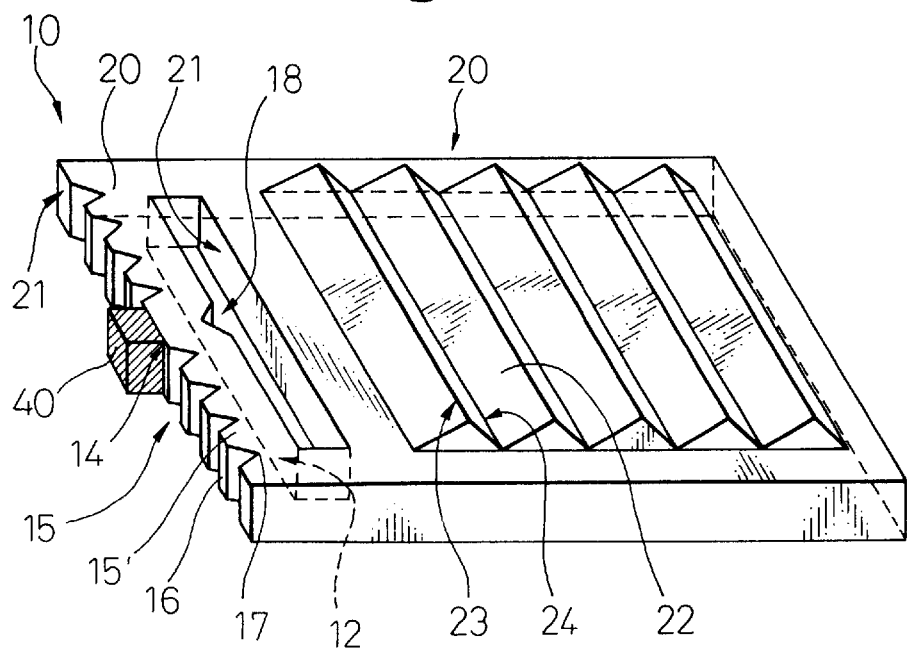
FIG. 18 is a perspective view of the lighting apparatus according to a fifth embodiment of the invention.

FIG. 18 is a diagram for explaining the fifth embodiment, in which a light receiving surface 14 is formed parallel to the incident surface 21 of the light guide plate 20 at the central portion along the length of the side surface 11 far from the light guide plate. The LED 40 is arranged on the light-receiving surface 14, and the surfaces other than the side surface of the LED 40 nearer to the light source rod 10 are treated to prevent the light leaking out.

A prism array 15 is formed in the area other than the light receiving surface 14 of the side surface 11 far from the light guide plate. The ridge 16 and the valley 17 of each prism 15' making up the prism array 15 extend parallel to each other along the thickness. According to the 13th embodiment, each ridge 16 is truncated and includes a flat portion parallel to the incident surface 21 of the light guide plate 20.

On the other hand, that side surface 12 of the light source rod 10 which is nearer to the light guide plate and opposite to the light-receiving surface 14 is formed with a triangular notch 18.

The light guide plate 20 is formed of a transparent material as is the light source rod 10, and the surface of the light guide plate 20 nearer to the object of display is formed with a prism array 22. The ridges 23 and the valleys 24 of the prism array 22 extend parallel to each other in the longitudinal direction.

Figure 19:
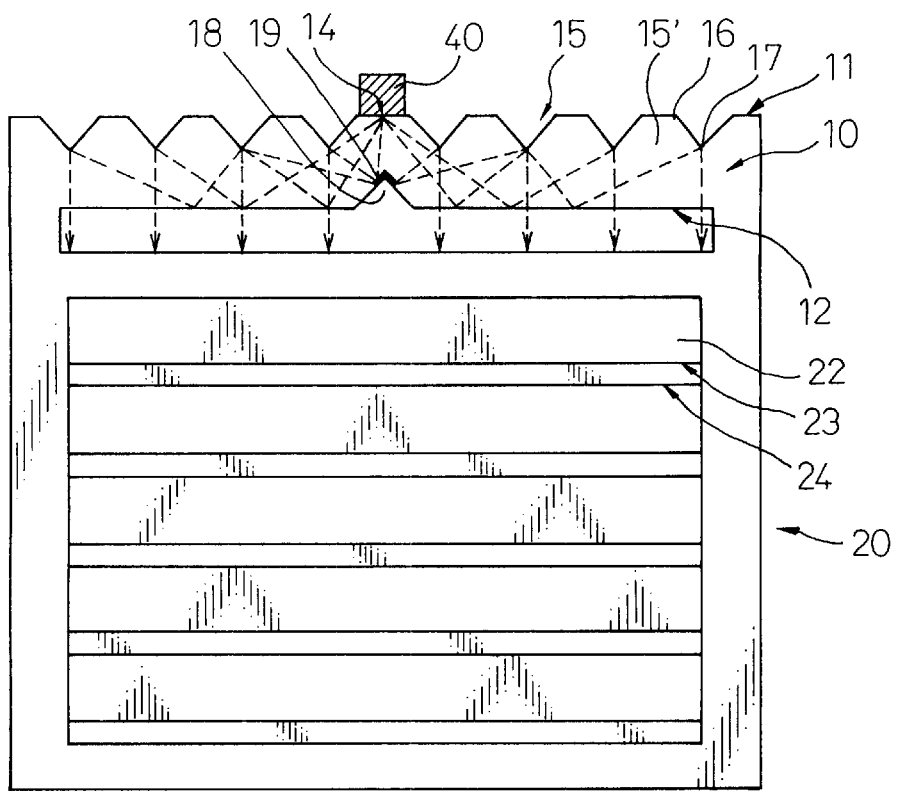
FIG. 19 is a plan view of the lighting apparatus according to the fifth embodiment of the invention.

FIG. 19 is a plan view of the configuration shown in FIG. 18. The light emitted from the LED 40 reaches the incident surface of the light guide plate 20 along the routes indicated by dashed arrows.

Specifically, the light emitted from the LED 40 is reflected in various directions on the inner surface of the notch 18 formed in the side surface 12 of the light source rod 10 nearer to the light guide plate, and the reflected light rays proceed toward the inner surface of each prism 15' of the prism array 15, where they are reflected, leave the side surface 12 nearer to the light guide plate and enter the light guide plate 20 by way of the incident surface 21.

If the light emitted from the LED 40 proceeds directly toward the incident surface 21 of the light guide plate 20 without being reflected on the notch 18 of the light source rod 10, a very bright portion is undesirably generated. In view of this, the portion defined by thick line at the center of the notch 18 is formed with a reflector 19 as direct emission prevention means. Another direct emission prevention means, other than the reflector, includes the coating process or installation of a light absorbing member.

According to the fifth embodiment configured and operating as described above, uniform light rays are emitted from the light guide plate.

Figure 20:
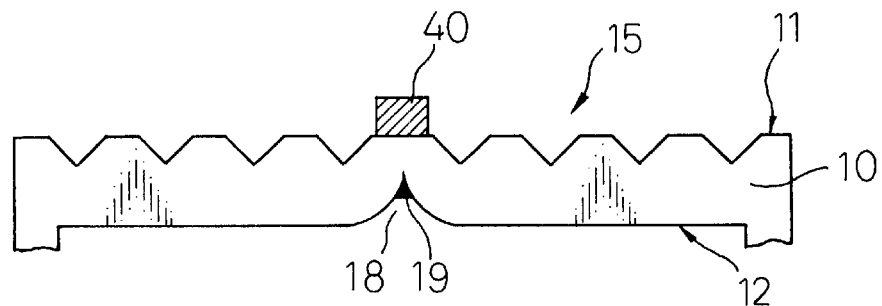
FIG. 20 is a plan view of the lighting apparatus according to a first modification of the fifth embodiment of the invention.

The first modification of the fifth embodiment shown in FIG. 20 is different from the fifth embodiment only in that the notch 18 of the light source rod 10 has a smoothly-expanded triangular foot. By doing so, the brightness of the area far from the LED 40 is improved and the uniformity of the luminance as a whole can be improved.

Figure 21:
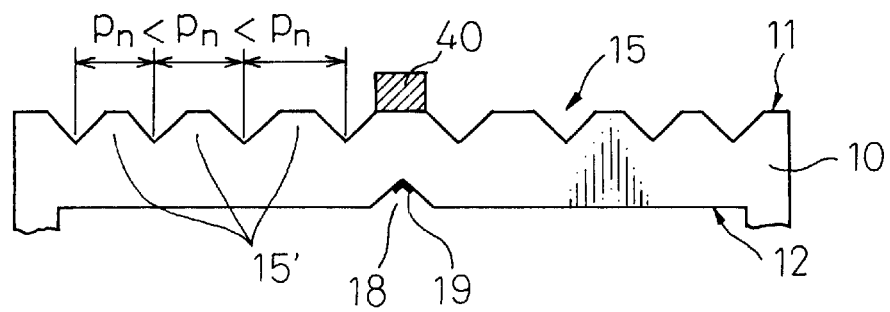
FIG. 21 is a plan view of the lighting apparatus according to a second modification of the fifth embodiment of the invention.

The second modification of the fifth embodiment shown in FIG. 21 is different from the fifth embodiment only in that the depth of the valley of the prism 15' making up the prism array 15 of the light source rod 10 remains the same while the valley pitch pn in the longitudinal direction is progressively increased and decreased away toward the LED 40. By doing so, the luminance in the area far from the LED 40 is improved and the overall uniformity of the luminance can be improved.

Figure 22:
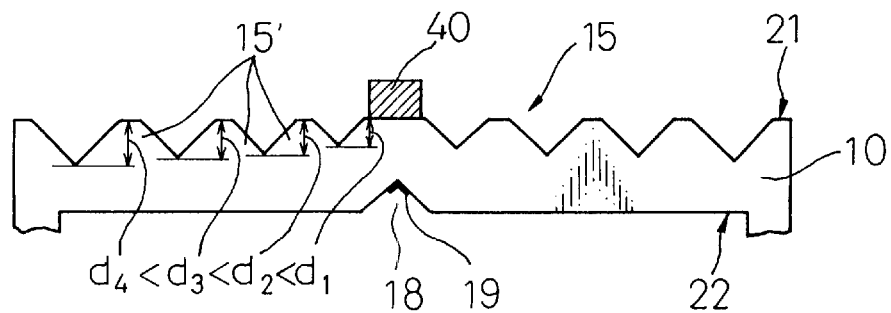
FIG. 22 is a plan view of the lighting apparatus according to a third modification of the fifth embodiment of the invention.

The third modification of the fifth embodiment shown in FIG. 22 is different from the 13th embodiment only in that the depth dn of the valley of the prism 15' making up the prism array 15 of the light source rod 10 is progressively decreased toward and increased away from the LED 40. By doing so, the luminance in the area far from the LED 40 is improved and the uniformity of the luminance can be improved.

Figure 23:
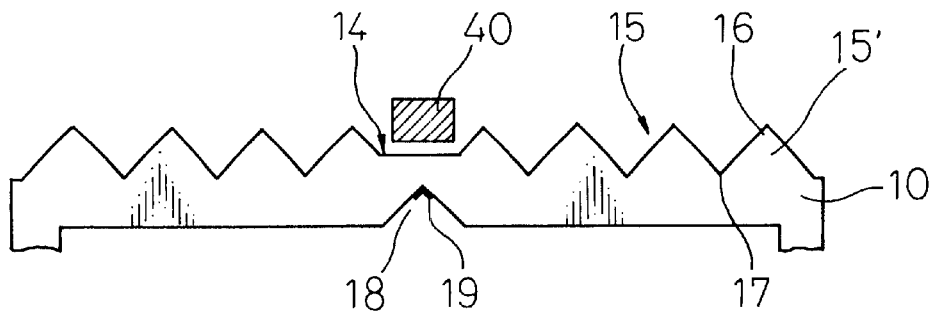
FIG. 23 is a plan view of the lighting apparatus according to a fourth modification of the fifth embodiment of the invention.

The fourth modification of the fifth embodiment shown in FIG. 23 is different from the first embodiment only in that the ridge 16 of the prism 15' making up the prism array 15 is not truncated, and the LED 40 is not in close contact with the light-receiving surface 14.

Figure 24:
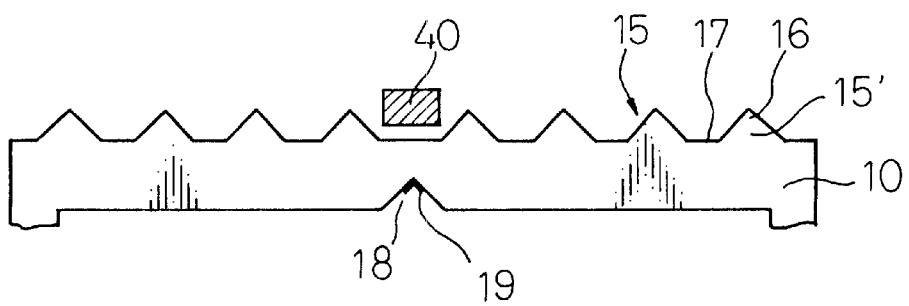
FIG. 24 is a plan view of the lighting apparatus according to a fifth modification of the fifth embodiment of the invention.

The fifth modification of the fifth embodiment shown in FIG. 24 is different from the fourth modification only in that the valley has a flat surface.

Figure 25:
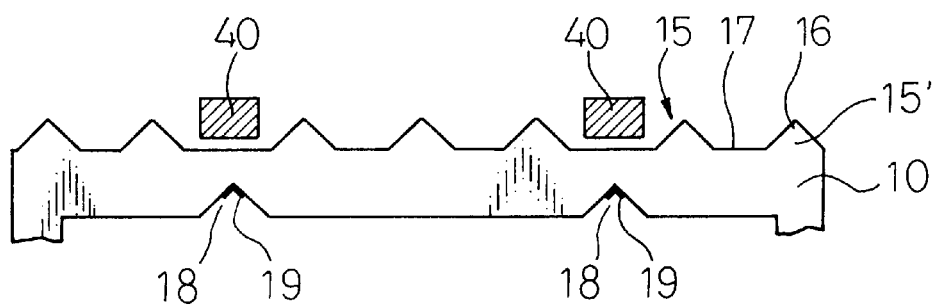
FIG. 25 is a plan view of the lighting apparatus according to a sixth modification of the fifth embodiment of the invention.

The sixth modification of the fifth embodiment shown in FIG. 25 is different from the fifth modification only in that two LEDs 40 are included for improving the uniformity of the luminance. Two LEDs 40 can be included also for the fifth embodiment and other modifications of the fifth embodiment. Further, the number of the LEDs 40 can be increased as required.

Figure 26:
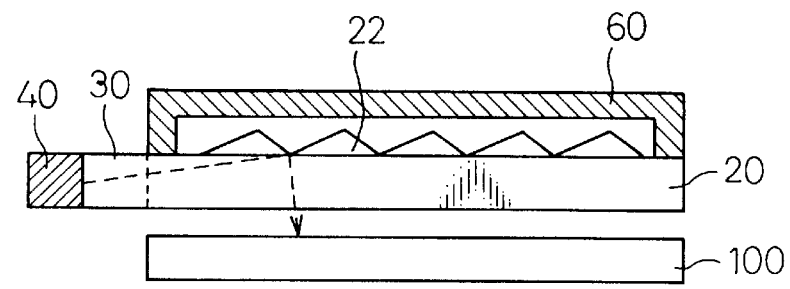
FIG. 26 is a plan view of the lighting apparatus according to a seventh modification of the fifth embodiment of the invention.

In the sixth embodiment shown in FIG. 26, the prism array 22 of the light guide plate 20 is arranged on the front side for a back lighting apparatus and, therefore, is liable to be damaged or gather dust. Thus, a protective cover 60 is arranged on the outside of the prism array 22.

The protective cover 60 described above is difficult to fabricate and mount. Therefore, an explanation will be given of the seventh embodiment in which an outer protective layer with a flat surface is laid on the surface of the prism array of the light guide plate 20 through an intermediate layer.

Figure 27:
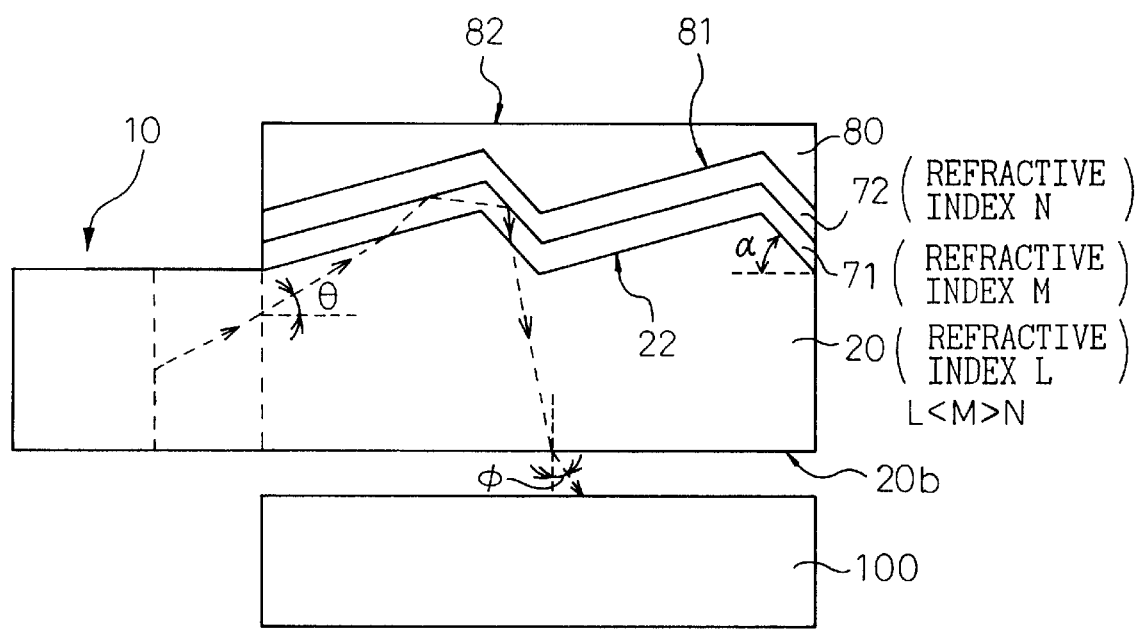
FIG. 27 is a side view of the lighting apparatus according to a sixth embodiment of the invention.

FIG. 27 is a diagram for explaining the feature of the seventh embodiment and shows a front lighting apparatus for radiating the light on a liquid crystal display unit. In FIG. 27, the upper side represents the front side, and the light guide plate 20 is arranged on the front side of the liquid crystal display apparatus 100.

A first intermediate layer 71, a second intermediate layer 72 and an outer protective layer 80 are accumulated in that order on the outside of the light guide plate. These elements are in close contact with each other.

The material of the light guide plate 20 is acrylic resin having a refractive index of 1.5 and is the same as that of the prior art arranged in direct contact with the air. A prism array 22 is formed on the front side. Although FIG. 27 shows only two prisms, about 400 prisms are actually formed in the width of 250 mm. The depth of the valley of the prism is about 5 $\mu$m, and the height from the reverse side 20a to the prism top is about 1 mm.

The first intermediate layer 71 is made of titanium oxide (TiO$_2$) having a refractive index of 2.2 to 2.4 and a thickness of about 100 nm.

The second intermediate layer 72 is made of silicon oxide (SiO$_2$) having a refractive index of 1.5 and a thickness of about 100 nm.

The first intermediate layer 71 and the second intermediate layer 72, though shown exaggerated in the drawings, are actually smaller by several tens of times than the depth of the valley of the prism. Thus it is quite impossible to fill the depth of the valley of the prism. As a result, an unevenness substantially equal to the prism array 22 of the light guide plate 20 remains on the outside of the second intermediate layer 72.

The outer protective layer 80 is made of a hard coat material such as siloxane or acrylic resin, and the outer surface 72 is kept smooth. In view of the fact that an unevenness substantially equal to the prism array 22 of the light guide plate 20 remains on the outside of the second intermediate layer 72 as described above, however, the inner surface 71 has a complementary unevenness of the surface. Thus, the total thickness of the outer protective layer 80 (from the outer surface 72 to the ridge of the inverted mountain of an unevenness on the inner surface 71) is at least larger than about 5 $\mu$m, or the depth of the valley of the prism of the light guide plate 20, and is about 10 $\mu$m under consideration.

As described above, the outer protective layer 80 with the surface thereof smoothed by a hard coat material is not easily damaged and hardly gathers dust. Also, no dust is accumulated between the layers which are closely attached to each other.

The refractive index M of the first intermediate layer 71 is larger than the refractive index L of the light guide plate 20 and the refractive index N of the second intermediate layer 72. The light that has entered the light guide plate 20, therefore, as indicated by arrows in FIG. 27, enters the first intermediate layer 71, is reflected on the boundary surface between the first intermediate layer 71 and the second intermediate layer 72, leaves the first intermediate layer 71, enters the light guide plate 20 again and, leaving the light guide plate 20 from the lower surface thereof, enters the liquid crystal display unit 100. In this way, the liquid crystal display screen 100 can be illuminated.

Assuming that the thickness of the intermediate layer 71 assumes a value obtained by dividing the wavelength (about 550 nm) of the light from the light source 2 by a value equal to a quadruple of the refractive index. Then, the reflectivity becomes the lowest so that the light is most liable to leave the first intermediate layer 71 toward the light guide plate According to the seventh embodiment, as described above, the light guide plate 20 is made of the same material as in the prior art, and has a refractive index L of about 1.5.

In the prior art, the light guide plate 20 is in contact with the air. Since the light guide plate and the air have a reflective index L of about 1.5 and about 1.0, respectively, and therefore, the ratio between the refractive index of the light guide plate 20 and the refractive index of the air is about 1.5. According to the first embodiment of the invention, on the other hand, the refractive index M of the first intermediate layer 71 is about 2.2 to 2.4 and the refractive index N of the second intermediate layer 72 is about 1.5, and therefore the ratio between the two refractive indexes is about 1.5. That is to say, L:M≈M:N, i.e. M$^2$≈L×N.

The illumination performance is dependent on the ability to deflect the light incident to the light guide plate 20 from the light source rod 10 toward the object of illumination (the liquid crystal display unit 100 in the case under consideration) on the boundary surface between the light guide plate 20 and the material external thereto. This ability, in turn, is determined by the ratio between the refractive indexes of the two materials sandwiching the boundary surface. According to the seventh embodiment of the invention, therefore, an illumination performance equivalent to that of the prior art can be obtained using the light guide plate 20 made of the same material as in the prior art.

The light from the light source rod 10 is reflected on the boundary surface between the first intermediate layer 71 and the second intermediate layer 72 as described above, and therefore the refractive index of the outer protective layer 80 outside of the second intermediate layer has no effect on the illumination performance. Thus, the material of the outer protective layer 80 can be selected with considerable freedom. Specifically, the refractive index of the material of the outer protective layer 80 may be larger or smaller than the refractive index N of the material of the second intermediate layer (which is $SiO_2$ with the refractive index of about 1.5 in the case under consideration).

FIG. 28 is a table indicating the range of the exit angle Φ (FIG. 27) relative to the range of the incident angle θ (FIG. 27) with the combination changed between the inclination angle α of the prism (FIG. 27), the refractive index M of the first intermediate layer 71, the refractive index L of the light guide plate 20 and the refractive index N of the second intermediate layer 71. This table shows that the larger the value of M/N, the nearer the exit angle Φ to zero so that the component leaving in the direction perpendicular to the light guide plate increases for a higher efficiency of illumination.

A single intermediate layer of $TiO_2$ may be employed. Since the refractive index of the outer protective layer has the direct effect on the illumination performance, however, the freedom of selecting the material of the outer protective layer is limited.

In addition, the layers can be closely attached using an adhesive and an anticontamination film of fluorine plastic can be laid, using an adhesive, on the outside of the outer protective layer 80, or an antireflection material can be laid, using an adhesive, on the reverse side of the light guide plate 20.

Also, the light guide plate 20 can be segmented into a portion not containing the prism array 22 and a portion containing the prism array 22.

What is claimed is:

1. A lighting apparatus for causing light from a light source to enter an incident surface of a light guide plate and to project the light toward an object of illumination from an exit surface of the light guide plate extending in a direction perpendicular to said incident surface,
    wherein the light source is made by placing a light-emitting diode, on or near a light source rod extending in a longitudinal direction parallel to the incident surface of the light guide plate, and the light source rod and the light guide plate are integrally made by forming a slot in a common plate, said slot keeping said incident surface of the light guide plate and an inner surface of said light source rod away from each other, a back wall of said light source rod extends parallel to said incident surface, and said slot extends parallel to said incident surface of the light guide plate to near longitudinal ends of the lighting apparatus.

2. A lighting apparatus according to claim 1, wherein a light-emitting diode is mounted on each longitudinal end surface of the light source rod.

3. A lighting apparatus according to claim 1, wherein the light-emitting diode is mounted on each of an upper surface, a lower surface, a side surface of the light source rod nearer to the light guide plate and a side surface of the light source rod far from the light guide plate, at each longitudinal end of the light source rod, the light being reflected toward a center by an inclined reflector.

4. A lighting apparatus according to claim 1, wherein a light-emitting diode is mounted on a side surface of a longitudinal central portion of the light source rod which is far from the light guide plate.

5. A lighting apparatus according to claim 4, comprising reflection means mounted on the side surface of the light source rod nearer to the light guide plate for reflecting the light incident to the light source rod from the light-emitting diode toward the side surface of the light source rod far from the light guide plate, and a prism array with ridges extending along a thickness in other than the side surface of the longitudinal central portion of the light source rod far from the light guide plate where the light-emitting diode is mounted.

6. A lighting apparatus according to claim 5, wherein said reflection means is a substantially triangular notch cut toward the light-emitting diode from the side surface of the light source rod nearer to the light guide plate and includes direct emission prevention means for preventing direct emission of the light at a forward end of the notch.

7. A lighting apparatus according to claim 5, comprising remote area luminance improving means for improving luminance of a remote area by changing a pitch or a valley depth of the prism array in accordance with a distance from the light-emitting diode.

8. A lighting apparatus according to claim 4, wherein a light-emitting diode is arranged in the notch having a concave lens surface and a convex lens surface is formed on a corresponding side surface of the light source rod nearer to the light guide plate.

9. A lighting apparatus according to claim 1, wherein light-emitting diodes are mounted on the light source rod through a gap.

10. A lighting apparatus according to claim 1, wherein a surface portion other than where said light-emitting diode is mounted on the light source rod is finished to be reflective.

11. A lighting apparatus according to claim 1, wherein a micro-unevenness is formed on a side surface of the light source rod far from the light guide plate.

12. A lighting apparatus according to claim 1, wherein a reflector is arranged on at least a selected one of an upper surface, a lower surface, a side surface of the light source rod nearer to the light guide plate and a side surface of the light source rod far from the light guide plate.

13. A lighting apparatus according to claim 1, comprising a reflector covering an opening of the slot on a side nearer to the object of illumination and an opening of the slot on a side far from the object of illumination.

14. A lighting apparatus according to claim 1, comprising means for balancing incident light on a side surface of the light source rod nearer to the light guide plate or the incident surface of the light guide plate.

15. A lighting apparatus according to claim 1, comprising a prism array on a front surface or a rear surface of the light guide plate.

16. A lighting apparatus according to claim 15, comprising a plurality of outer protective layers laid on an outside of the prism array through at least an intermediate layer.

17. A lighting apparatus according to claim 16, comprising a plurality of said intermediate layers, wherein a refractive index of a first inner intermediate layer is larger than a refractive index of the light guide plate and larger than a refractive index of an outer second intermediate layer.

18. A lighting apparatus according to claim 15, comprising a protective cover arranged on an outside of said prism array.

19. A lighting apparatus according to claim 1, wherein the lighting apparatus comprises a front lighting apparatus for a liquid crystal display unit.

20. A lighting apparatus according to claim 1, wherein the lighting apparatus comprises a back lighting apparatus for a liquid crystal display unit.

21. A lighting apparatus for causing light to project toward an object of illumination, comprising;
   a light source;
   a light guide plate having an incident surface and an exit surface extending in a direction perpendicular to said incident surface, light from the light source entering the incident surface of the light guide plate; and
   a light source rod extending in a longitudinal direction parallel to the incident surface of the light guide plate; and
   a slot formed in a gap between a longitudinal central portion of the incident surface of the light guide plate and a longitudinal central portion of an inner surface of said light source rod, thereby keeping the longitudinal central portion of the incident surface of the light guide plate and the longitudinal central portion of the inner surface of said light source rod away from each other, a back wall of said light source rod extending parallel to said incident surface of the light guide plate, and said slot extends parallel to said incident surface of the light guide plate,
   wherein the light source is made by placing a light-emitting diode, on or near the light source rod, and the light source rod and the light guide plate are integrally made by forming a slot in a common plate.

22. A lighting apparatus according to claim 21, wherein a front wall of the light source rod provided opposite said back wall of the light source rod includes concave lens surfaces.

23. A lighting apparatus according to claim 21, wherein a front wall of the light source rod provided opposite said back wall of the light source rod is inclined with respect to the back wall of the light source rod extending along a thickness direction.

24. A lighting apparatus according to claim 21, wherein the incident surface of the light guide plate inclined with respect to the back wall of the light source rod extending along a thickness direction.

25. A lighting apparatus for causing light from a light source to enter an incident surface of a light guide plate and to project the light toward an object of illumination from an exit surface of the light guide plate extending in a direction perpendicular to said incident surface comprising:
   a prism array on a front surface or a rear surface of the light guide plate;
   a plurality of outer protective layers laid on an outside of the prism array through at least an intermediate layer; and
   a plurality of said intermediate layers, wherein a refractive index of a first inner intermediate layer is larger than a refractive index of the light guide plate and larger than a refractive index of an outer second intermediate layer,
   wherein the light source is made by placing a light-emitting diode, on or near a light source rod extending in a longitudinal direction parallel to the incident surface of the light guide plate, and the light source rod and the light guide plate are integrally made by forming a slot in a common plate.

* * * * *